United States Patent [19]

Loh

[11] Patent Number: 5,034,989
[45] Date of Patent: Jul. 23, 1991

[54] ON-LINE HANDWRITTEN CHARACTER RECOGNITION APPARATUS WITH NON-AMBIGUITY ALGORITHM

[76] Inventor: Shiu-Chang Loh, Queen's Park Place, 62 Wellesley Street West, Apt. 206, Toronto, Ontario, Canada, M5S2C3

[21] Appl. No.: 298,566

[22] Filed: Jan. 17, 1989

Related U.S. Application Data

[63] Continuation-in-part of Ser. No. 131,734, Dec. 11, 1987, abandoned.

[51] Int. Cl.⁵ .............................................. G06K 9/64
[52] U.S. Cl. ...................................... 382/13; 382/24; 382/59
[58] Field of Search .................. 382/13, 38, 3, 24, 40, 382/57, 10, 11; 178/18, 19, 20, 30

[56] References Cited

U.S. PATENT DOCUMENTS

| | | | |
|---|---|---|---|
| 4,040,009 | 8/1977 | Kadota et al. | 340/146.3 |
| 4,365,235 | 12/1982 | Greantas et al. | 340/146.3 |
| 4,542,526 | 9/1985 | Satoh et al. | 382/13 |
| 4,561,105 | 12/1985 | Crane et al. | 382/13 |
| 4,685,142 | 8/1987 | Ooi et al. | 382/13 |

Primary Examiner—Michael Razavi
Attorney, Agent, or Firm—Frank M. Linguiti

[57] ABSTRACT

An apparatus and a method for identifying handwritten characters is provided, each of the characters being a member of a set and being formed from a number of predetermined primitives. The apparatus includes an input device receiving successively each primitive forming a character. The input device generates input signals for each primitive forming the handwritten character. The input signals are conveyed to a processor. The processor examines the input signals and attempts to identify each of the primitives used to form the handwritten character. A primitive code is generated for each identified primitive and an unidentified primitive code is generated for each unidentified primitive. The primitive and unidentified primitive codes are combined to form an input character code. A memory is provided and stores a character code and an international output code for each of the characters in the set of characters. A comparator compares the input character code generated for the handwritten character with each of the character codes stored in the memory. When the input character code is equivalent to a character code associated with only one output code, the output code is conveyed to an output device such as a printer wherein a reproduction of the handwritten character is formed. When the character code is equivalent to a character code associated with more than one output code, a differentiator detects the correct output code associated with the input character code so that the handwritten character can be reproduced.

30 Claims, 7 Drawing Sheets

|     | $Pr_a$ | $Pr_b$ | $Pr_c$ | $Pr_d$ | $Pr_e$ | $Pr_f$ | $Pr_g$ | $Pr_h$ | $Pr_i$ | $Pr_j$ | $Pr_k$ | $Pr_l$ | $Pr_m$ | $Pr_n$ | $Pr_o$ |
|---|---|---|---|---|---|---|---|---|---|---|---|---|---|---|---|
| $Pr_a$ | 1.0 | 0.4 | | | | | | | | | | | | | |
| $Pr_b$ | | 1.0 | | | | | | | | | | | | | |
| $Pr_c$ | | | 1.0 | 0.6 | 0.6 | | | | | | | | | | |
| $Pr_d$ | | | | 1.0 | | | | | | | | | | | |
| $Pr_e$ | | | | | 1.0 | | | | | | | | | | |
| $Pr_f$ | | | | | | 1.0 | | | | | | | | | |
| $Pr_g$ | | | | | | | 1.0 | | | | | | | | |
| $Pr_h$ | | | | | | | | 1.0 | | | | | | | |
| $Pr_i$ | | | | | | | | | 1.0 | | | | | | |
| $Pr_j$ | | | | | | | | | | 1.0 | | | | | |
| $Pr_k$ | | | | | | | | | | | 1.0 | | | | |
| $Pr_l$ | | | | | | | | | | | | 1.0 | | | |
| $Pr_m$ | | | | | | | | | | | | | 1.0 | | |
| $Pr_n$ | | | | | | | | | | | | | | 1.0 | |
| $Pr_o$ | | | | | | | | | | | | | | | 1.0 |
| U | | | | | | | | | | | | | | | |

FIG. 10

ON-LINE HANDWRITTEN CHARACTER RECOGNITION APPARATUS WITH NON-AMBIGUITY ALGORITHM

This is a continuation-in-part of U.S. patent application Ser. No. 07/131,734, filed Dec. 11, 1987, now abandoned.

The present invention relates to an apparatus and method for identifying handwritten characters.

Since trade between Non-English speaking countries and Western countries has increased dramatically, the importance of communications has increased. For example, in the past when corresponding between English and Chinese speaking countries, a document written in English that was received in China would firstly be forwarded to a government translation centre. The document would then be translated and transcribed by hand into Chinese and finally delivered to the addressee of the document When a response to the translated document was prepared, the response would be translated from Chinese into English at the government translation centre and forwarded to the English correspondent. However, a problem existed in that the use of translators to transcribe the documents from English to Chinese and vice versa added a significant delay i n the communications process.

To overcome these difficulties, a typewriter device has been developed having keys representing the ideographic characters of the Chinese language. This device allows hard copies of documents written in Chinese to be produced by hiring an operator skilled in the Chinese language and capable of using the typewriter. However, a problem exists in that a large number of keys are required on the typewriter device since the Chinese language includes more than 50,000 different ideographic characters. Improvements to this type of device have been introduced to reduce the number of keys required by using function keys, however, the above-mentioned problem still exists. Furthermore, another problem exists when using the typewriter devices in that extensive training is required for the operators to learn how to use adequately the keyboard device, a process which is expensive and time consuming.

To overcome the problems encountered when using the keyboard devices, an ideographic character detection apparatus has been developed for receiving and identifying handwritten ideographic characters. The apparatus requires that the ideographic character be written on an input device and that the written characters be formed from predetermined fundamental strokes or primitives which are typical strokes used by everyone who writes in the ideographic language. After an ideographic character has been entered into the apparatus, the apparatus examines the primitives forming the entered ideographic character and compares the entered primitives with the contents of a look-up table. The look-up table stores a plurality of variations of each of the predetermined primitives to accommodate variations in user's handwriting. Due to the large number of variations of each primitive stored in the table, the primitives forming the character are usually determined by the device. The table also stores the sets of primitives used to form each of the characters in the ideographic language. If the set of primitives forming the entered character corresponds with one of the sets of primitives in the look-up table, an output code associated with the set of primitives is generated and conveyed to an output device. This allows a hard copy image of the entered handwritten ideographic character to be formed. However, a problem exists in that due to the large number of variations of each primitive stored in the table, the processing speed of the apparatus is greatly reduced making it unsuitable for real-time applications.

Moreover, the number of predetermined fundamental strokes or primitives used in this apparatus has typically been chosen to be five or less or twenty or more. By using only five fundamental primitives in the sub-set to form every ideographic character in the language a problem exists in that a large number of different ideographic characters are formed from the identical set of primitives even though the ideographic characters are unique in appearance. This results in the decreased ability of the apparatus to distinguish between different ideographic characters.

To attempt to overcome this problem, twenty or more distinct primitives have been included in the sub-set. However, the same problem still exists in that different ideographic characters are still formed from the identical series of primitives although the occurrence of a set of primitives representing more than one ideographic character is reduced. However, by increasing the number of primitives in the sub-set, another problem exists in that the processing time of the apparatus is further increased.

Furthermore, still yet another problem exists in that typically these devices are capable of detecting characters written in one language and do not permit multi-language character detection. Accordingly, there is a need for an improved character recognition apparatus.

It is therefore an object of the present invention to obviate or mitigate the above disadvantages.

According to the present invention there is provided a character recognition apparatus for identifying characters formed from a number of primitives, said characters and primitives being members of predetermined sets, said apparatus comprising:

input means for receiving successively each of the primitives forming said character and generating input signals for each of said received primitives;

processing means receiving said input signals and identifying each of said primitives received by said input means, said processing means generating a character code representing said character upon identification of said primitives;

storage means storing a character code and an associated output code for each of the characters in said set;

comparing means comparing said character code generated for said entered character with each of said character codes in said storage means to identify said entered character; and output means in communication with said comparison means and generating a reproduction of said entered character upon the identification thereof by said comparison means.

Preferably, the apparatus further includes differentiation means examining said input signals generated for each of said primitives and performing operations thereon, when said character code is equivalent to a character code associated with a plurality of output codes to identify the output code associated with said character.

Preferably the apparatus is provided with substitution means for selecting the character code stored in the storage means having the highest probability of being equivalent to the character code generated for the entered character, when the input character code is not equivalent to any of the character codes stored in the storage means. It is also preferred that the output means comprises at least one device chosen form the group comprising a printer, audio synthesizer or video display terminal to allow a reproduction of the received ideographic character to be formed or an audio reproduction of the ideographic character to be produced.

Preferably, the character recognition apparatus is capable of recognizing characters written in all ideographic languages, upper case English language characters, and Russian characters.

It is also desirable that the predetermined set of fundamental primitives is chosen to comprise 20 unique primitives, the various combinations of which will form substantially all characters in a plurality of different languages, while decreasing the occurrence of different characters being formed from the same series of primitives. Thus, the use of twenty distinct primitives decreases the occurrence of entered characters being represented character codes which are equivalent to a character code associated with more than one international output code. This of course, increases the probability of detecting the correct ideographic character.

An embodiment of the present invention will now be described, by way of example only, with reference to the accompanying drawings in which:

FIG. 10 is an illustration of a probability matrix used in the device illustrated in FIG. 1;

Figure 1:
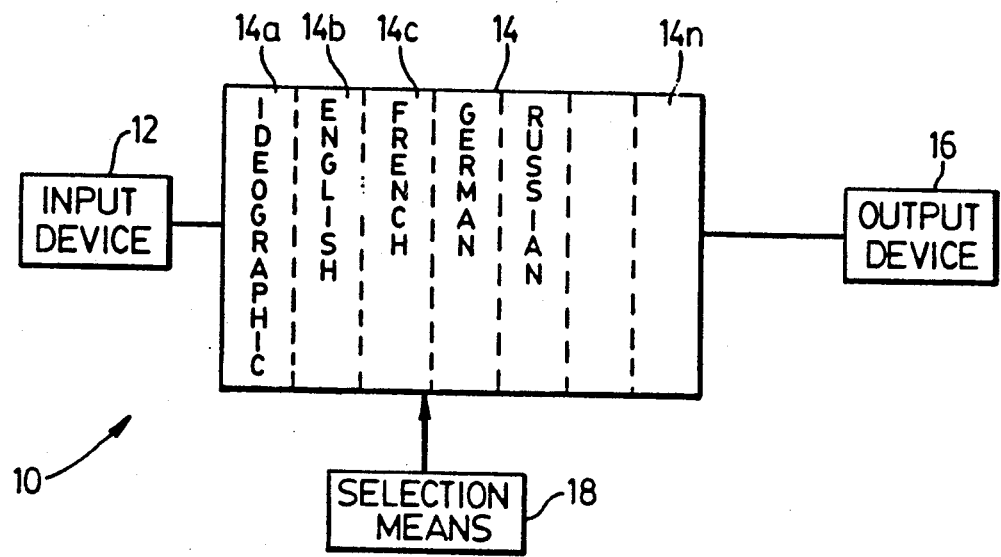
FIG. 1 is a functional block diagram of an apparatus for identifying handwritten characters.

Referring to FIG. 1, an apparatus 10 for identifying handwritten characters is shown. The apparatus 10 comprises an input device 12 connected to a data processor 14. The input device 12 receives the handwritten character and converts the character into a series of signals that are conveyed to the data processor 14. The data processor 14 processes the received signals in order to detect the character entered on the input device 12. An output device 16 is also connected to the data processor 14 and receives therefrom an international ASCII output code representing the handwritten character received by the input device 12. This allows a reproduction of the handwritten character to be generated.

The apparatus 10 is operable in a number of modes, each mode of which allows handwritten characters of a different language to be recognized and reproduced. Selection means 18 are provided to allow a user to select the language in which the apparatus 10 is to operate. Thus, the processing means 14 is responsive to the selection means 18 and is partitioned into sections 14a, 14b, . . . , 14n so that appropriate information for each language is separately stored and accessible depending on the mode selected by the selection means 18.

For simplicity, the apparatus shown in FIG. 1 will be described when the processing means 14 is conditioned to detect ideographic characters, although it should be realized that characters in other languages can be detected in a similar manner by conditioning the selection means 18 to a different mode.

Figure 2:
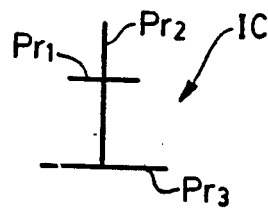
FIG. 2 is an illustration of an ideographic character.

Referring to FIG. 2, an ideographic character IC is shown. As can be seen, the ideographic character IC is formed from a number of fundamental strokes or primitives, the primitives being labelled as $Pr_1$ to $Pr_3$ respectively. The primitives $Pr_1$ to $Pr_3$ are fundamental strokes used when writing in the ideographic language The writing order of the sequence of strokes for ideographic characters is mainly based on logic, efficiency, experience and natural human habits. According to several research findings, there exist a number of basic rules when writing ideographic characters and they are as follows:

up-down
left-right
out-in
horizontal-vertical
left slant-right slant
first enter-last close.

Each Chinese character may employ one or more of the above rules in the formation of the character. Examples of basic stroke sequences of ideographic characters are illustrated in Table 1 hereinbelow:

TABLE 1

| UP-DOWN | HORIZONTAL-VERTICAL |
|---|---|
| LEFT-RIGHT | LEFT SLANT-RIGHT SLANT |
| OUT-IN | FIRST ENTER-LAST CLOSE |

Figure 3:
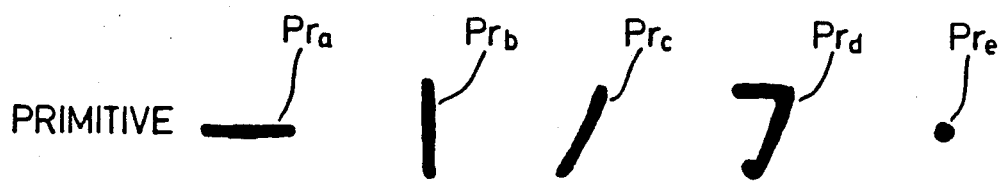
FIG. 3 are illustrations of the fundamental primitives used in the device illustrated in FIG. 1.
Figure 3:
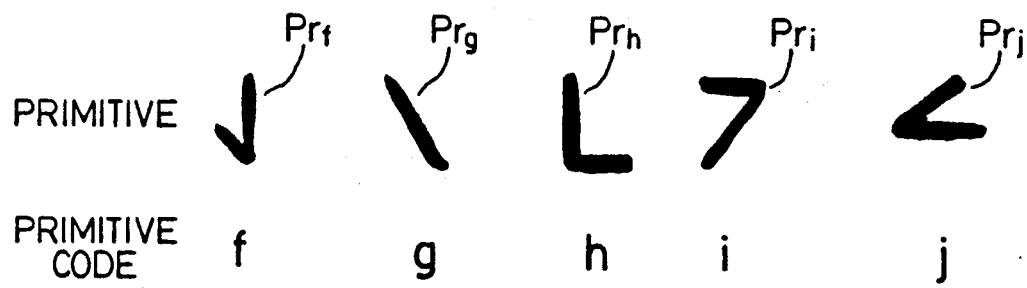
Figure 3:
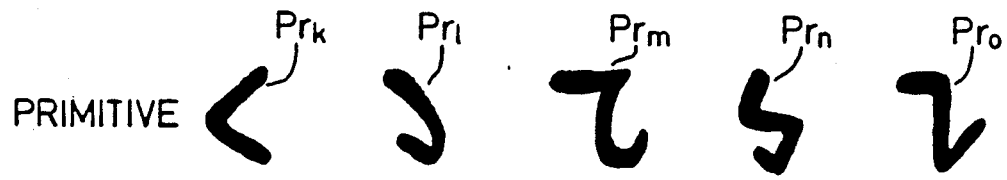
Figure 3:
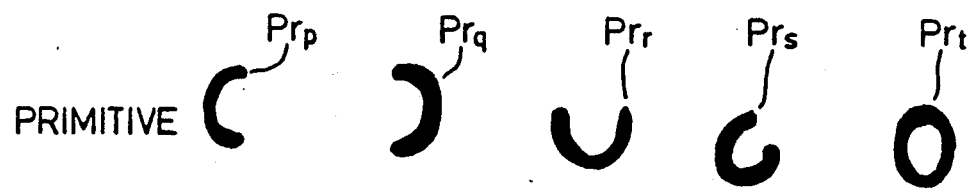

To decrease the number of primitives that a user must be required to write when forming an ideographic character and to reduce the amount of data that has to be processed by the processor 14, fifteen of the twenty primitives $Pr_a$ to $Pr_o$ illustrated in FIG. 3 are used by the apparatus 10. The fifteen primitives $Pr_a$ to $Pr_o$ are members of the set of fundamental strokes typically used in the formation of ideographic characters. This sub-set of primitives is chosen since all of the ideographic characters in the various languages can be formed from various combinations of the primitives $Pr_a$ to $Pr_o$. The primitives $Pr_p$ to $Pr_t$ are used with some of the primitives $Pr_a$ to $Pr_o$ when the apparatus is operating to detect characters written in another language as will be described.

Figure 5:
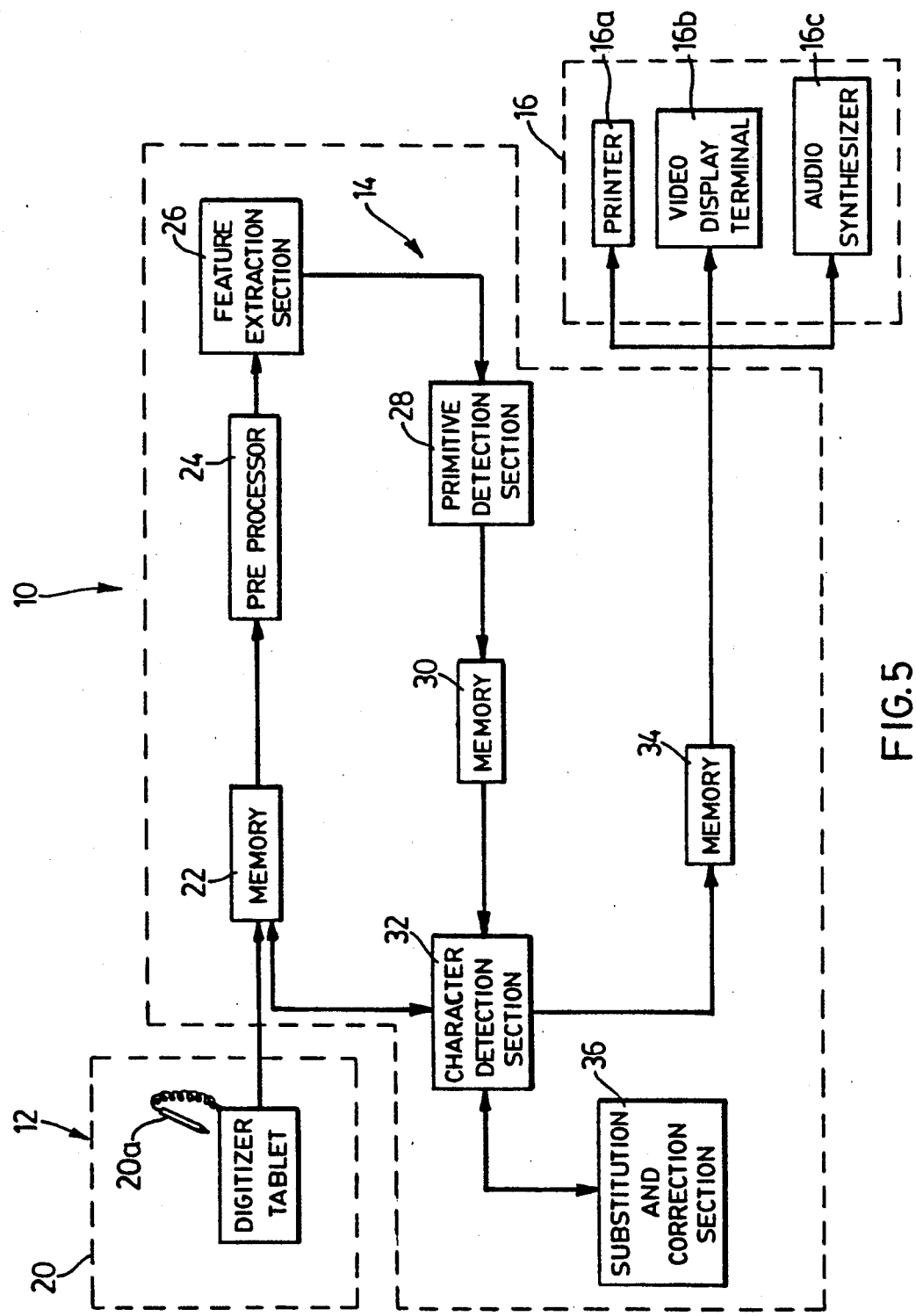
FIG. 5 is a more detailed functional block diagram of the device illustrated in FIG. 1.

Referring now to FIG. 5, the apparatus 10 is better illustrated. The input device 12 comprises an on-line digitizer tablet 20 having a stylus 20a. The ideographic character to be recognized is written on the tablet 20 with the stylus 20a. This causes a series of cartesian co-ordinate data point signals $PN_0$ to $PN_N$ to be generated for each of the primitives $Pr_a$ to $Pr_o$ entered that form the ideographic character IC. The upper case "N" of the data point signal refers to the order in which the primitive was entered when forming the character IC while the subscript "N" refers to the number of the sampled point along the primitive. The data point signals are then conveyed to the data processor 14.

A memory 22 is located in the data processor 14 and is connected to the digitizer tablet 20. The memory 22 receives the raw cartesian co-ordinate data point signals and stores them prior to processing. A pre-processor 24 receives a copy of the cartesian co-ordinate data point signals $PN_0$ to $PN_N$ for each entered primitive and processes the data to remove redundant and spurious data. The pre-processed cartesian co-ordinate data signals are conveyed from the pre-processor 24 to a feature extraction section 26 which converts the cartesian co-ordinate data point signals for each of the entered primitives Pr into a vector code and a series of scalars.

The vector code and series of scalars generated by the feature extraction section 26 are applied to a primitive detection section 28 which compares the vector code generated for each entered primitive $Pr_a$ to $Pr_o$ forming the character IC with the contents of a look-up table or dictionary. This allows the processor 14 to detect whether the entered primitives are members of the fifteen primitives $Pr_a$ to $Pr_o$. When an entered primitive Pr results in the formation of a vector code equivalent to a vector code associated with only one of the fifteen primitives stored in the primitive detection section 28, a primitive code a to o is generated and conveyed to a memory 30. This process is performed for each vector code representing each primitive Pr forming the entered ideographic character IC. Thus, a series of primitive codes or a character code is generated for the entered character which represents the ideographic character IC. However, if a vector code generated for an entered primitive Pr is equivalent to a vector code associated with more than one of the fifteen primitives $Pr_a$ to $Pr_o$, the detection section 28 performs tests on the series of scalars associated with the generated vector code to detect the correct entered primitive.

The generated character code is conveyed from the memory 30 to a character detection section 32 and compared with the contents of a second look-up table or dictionary. Section 32 stores the character code representing each of the ideographic characters in the language. The stored character codes are based on the requirement that the ideographic characters are formed from a combination of the fifteen primitives illustrated in FIG. 3 and that the characters are entered on the tablet 20 in an order as determined by the previously mentioned rules. Since the previously mentioned rules are generally used when writing in an ideographic language, character codes which can represent ideographic characters, but are formed from primitives entered in an incorrect order are omitted from the look-up table.

When the character code generated for the entered ideographic character IC is equivalent to a character code found in the character detection section 32, an associated output code or international ASCII output code is outputted to a memory 84. However, if the character code is equivalent to a character code representing more than one ideographic character, the character detection section 32 performs operations on the raw cartesian co-ordinate data point signals stored in the memory 22 to determine the correct ideographic character IC which the character code represents. This allows the correct international ASCII code to be outputted to the memory 34.

A substitution and correction means 36 is also provided and examines the entered character code when it is not equivalent to a character code stored in the character detection section 32. The substitution means 36 substitutes for the entered character code, the most probable character code that the entered character code was supposed to represent and conveys it back to the character detection section 32 wherein the above-mentioned process is performed.

The international ASCII code representing the ideographic character IC stored in the memory 34 is applied to the output device or devices 16 which typically include a video display terminal (VDT) 16a, printer 16b and/or a video synthesizer 16c wherein an audio and/or visual reproduction of the ideographic character IC can be formed.

Figure 6:
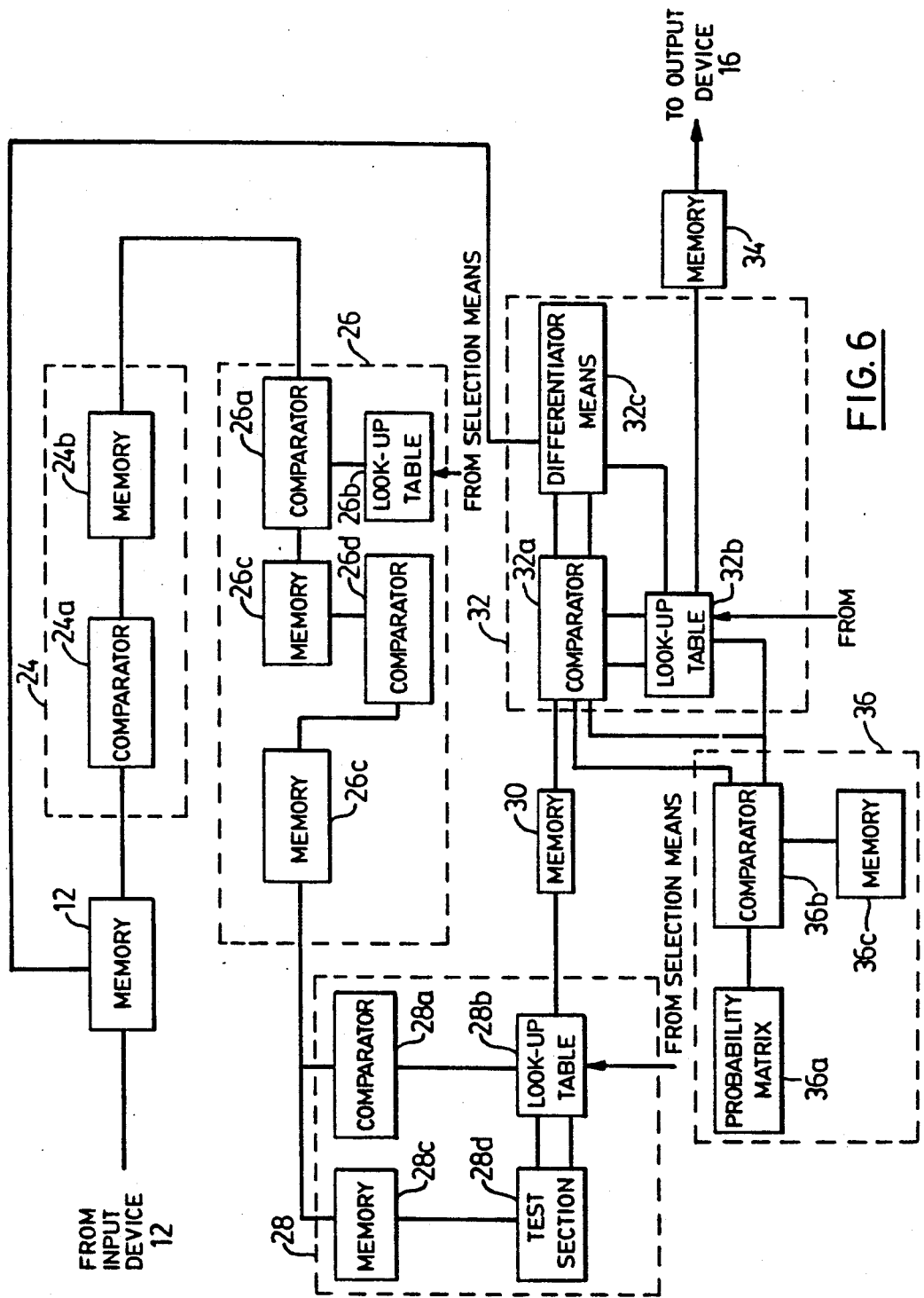
FIG. 6 is a detailed functional block diagram of a portion of the device illustrated in FIG. 1.

Referring to FIG. 6, the processing means 14 is better illustrated. The pre-processor 24 comprises a comparator 24a and a memory 24b which function in a manner to be described to eliminate redundant and spurious cartesian co-ordinate data point signals. The feature extraction section 26 includes a second comparator 26a and a look-up table or dictionary 26b which function to generate vectors for adjacent cartesian co-ordinate data point signals forming each primitive Pr. A memory 26c receives the vectors and in turn conveys the vectors to a third comparator 26d. The comparator 26d examines the vectors and removes redundant information to form a series of unit vectors or a vector code for each primitive Pr and a series of scalars. The scalars represent the length of each unit vector in the vector code generated for each primitive. The vector code and series of scalars generated for each primitive Pr are conveyed to a memory 26e and stored prior to being conveyed to the primitive detection section 28.

The primitive detection section 28 includes a fourth comparator 28a connected to a second look-up table or dictionary 28b. The table 28b stores a list of predetermined vector codes and a primitive code for each primitive $Pr_a$ to $Pr_o$. The vector codes represent one or more of the fifteen primitives $Pr_a$ to $Pr_o$. The primitive detection section 28 also comprises a memory 28c which holds the scalars generated for each vector code and a test section 28d. The test section 28d performs operations on the series of scalars if the vector code associated therewith is equivalent to a vector code which represents more than one of the fifteen primitives. This allows the correct primitive to be determined. When the vector code for each of the entered primitives Pr is located in the dictionary 28b, the primitive code a to o associated therewith is applied to the memory 30.

The series of primitive codes or character code generated for the entered ideographic character IC is conveyed to the character detection section 32 which comprises a fifth comparator 32a and a third look-up table or dictionary 32b. The dictionary 32b stores a list of the character codes forming each of the ideographic characters in the language and an associated international output code. The comparator 32a and the dictionary 32b function to detect whether the character code representing the entered handwritten ideographic character IC is equivalent to a character code storec in the dictionary 32b representing one or more of the ideographic characters in the language. The character detection section 32 also includes a differentiator 32c which performs tests on the raw cartesian co-ordinate data point signals if the character code is equivalent to a character code stored in the dictionary 32b which represents more than one ideographic character. This allows the correct ideographic character to be detected. When the correct ideographic character has been identified, the international ASCII code associated therewith is conveyed to the memory 34 and in turn to the output device 16.

As mentioned previously, when the character code is not equivalent to a character code found in the dictionary 32b, the substitution and correction means 36 is used. The substitution section 36 includes a probability matrix 36a, a sixth comparator 36b and a memory 36c which collectively function to determine the most probable character code that the character code generated for the entered handwritten ideographic character IC was supposed t be. This increases the probability of detecting the ideographic character IC entered on the digitizer tablet 20.

When an ideographic character IC is to be entered into the apparatus 10 via the digitizer tablet 20, the stylus 20a is placed on the tablet 20 and each of the primitives Pr forming the ideographic character IC is drawn separately. As described hereinabove, the primitives used to form the ideographic character IC must be substantially equivalent to one of the fifteen primitives $Pr_a$ to $Pr_o$. However, this limitation does not pose many problems since each of the fifteen primitives are fundamental strokes used by substantially everyone who is capable of writing in an ideographic language. Furthermore, the primitives $Pr_a$ to $Pr_o$ are chosen to reduce the number of entered characters that generate the same character code when inputted into the apparatus 10 and to simplify processing in section 14. After a primitive Pr has been entered, the stylus 20a is removed from the tablet 20 for a predetermined length of time. This results in a time-out signal being generated which allows the data processor 14 to recognize that the primitive Pr has been completely entered. Thereafter, the next primitive forming the character is entered and a time-out signal is generated. This process continues until each primitive forming the character has been entered into the apparatus 10.

As the stylus 20a is moved across the tablet 20 to form a primitive Pr, a series of cartesian co-ordinate data point signals are generated. The data processor 14 samples the cartesian co-ordinate data point signals generated for each primitive at a sampling rate of approximately 100 samples per second and stores the sampled co-ordinate data signals in the memory 22. The sampled data for each primitive is continuously stored in separate registers until the data processor 14 receives a time-out signal signifying that the complete primitive has been entered. While the next primitive $Pr_2$ is being formed on the tablet 20, the sampled cartesian co-ordinate data point signals are separately stored in different registers in the memory 22 until the next time-out signal is detected by the processor 14. This process continues until each primitive forming the ideographic character has been entered and the cartesian co-ordinate data signals generated therefor have been stored separately in the memory 22. To indicate to the data processor 14 that the entire ideographic character IC has been entered, an end-of-character (EOC) key located on the tablet must be depressed This prevents further data generated by the tablet 20 from corrupting the data associated with previously entered handwritten ideographic character.

Since a digitizer tablet 20 is used, temporal and irregular noise occurs during the sampling process due to miscoupling of the stylus 20a and the digitizer tablet surface 20. Furthermore, small amplitude noise occurs due to uneven movements in the operator's hand which introduces discrepancies between the sampled cartesian co-ordinate data point signals and the desired cartesian co-ordinate data point signals. Also, the slow movement of the stylus 20a across the digitizer tablet surface 20a with respect to the sampling rate of the processor 14 introduces a large number of redundant data point signals which in turn requires a large amount of storage space and increases the processing time of the apparatus 10. Thus, as mentioned previously, the pre-processor 24 is used to reduce the redundant and spurious data.

To perform this function, a copy of the sampled cartesian co-ordinate data point signals is applied to the comparator 24a. To reduce the noise caused by the inadvertent decoupling of the stylus 20a and the digitizer tablet 20, the sampled cartesian co-ordinate data point signals are separately analyzed. If any sampled cartesian co-ordinate data point signal is detected as having a set of co-ordinates extending beyond the boundary of the digitizer tablet 20, the cartesian co-ordinate data point signal is deleted. Secondly, to reduce the amount of redundant data and hence, to increase the processing speed of the apparatus 10, the first two cartesian co-ordinate data point signals are compared in the comparator 24a. If the distance between the two cartesian co-ordinate data point signals is less than a predetermined threshold value, the second sampled data point signal is deleted and the distance between the first and the third sampled cartesian co-ordinate data point signals is examined. This process continues until the distance between two data point signals is greater than the threshold value. When, the distance is greater than the threshold value, the first data point signal is conveyed to the memory 24b and the other data point signal is compared with the next preceding data point signal.

Furthermore, if the distance between the two cartesian co-ordinate data point signals is greater than a second predetermined threshold value, the second cartesian co-ordinate data point signal is compared with the third data point signal. If the distance between the second and third data point signals is larger than the second threshold value, the second data point signal is assumed to have been generated due to an inadvertent miscoupling of the stylus 20a and the tablet 20 and is deleted. However, if the distance between the second data point signal and the third data point signal is less than the second threshold value, the first data point signal is assumed to have been generated inadvertently and is deleted. This process is performed on the sampled cartesian co-ordinate data point signals for each of the entered handwritten primitives forming the entered character and hence, reduces the amount of data that requires processing.

Figure 4A:
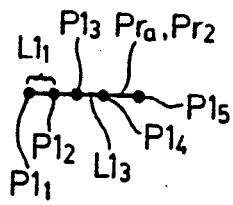
FIGS. 4a to 4c is an illustration of the method of forming the character shown in FIG. 2 from the primitives shown in FIG. 3.
Figure 4B:
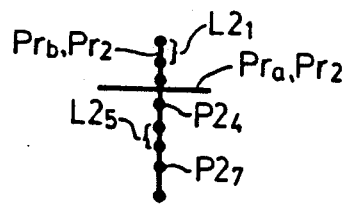
Figure 4C:
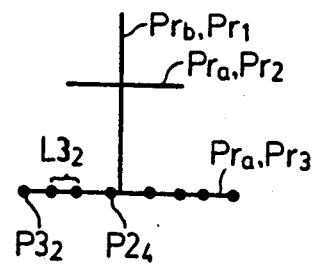

For example, if the ideographic character IC illustrated in FIG. 2 is entered into the apparatus 10, the primitives $Pr_1$ to $Pr_3$ forming the character IC are entered on the tablet 20 separately. The data processor 14 samples the cartesian co-ordinate data generated by the tablet 20 for the first primitive $Pr_1$ and stores the sampled cartesian co-ordinate data point signals $P1_1$ to $P1_5$ in the memory 22 as shown in FIGS. 4a to 4c. Similarly, the processor 14 samples the cartesian co-ordinate data point signals $P2_1$ to $P2_8$ and $P3_1$ to $P3_8$ generated for the next two primitives $Pr_2$ and $Pr_3$ respectively and stores the sampled cartesian co-ordinate data point signals in the memory 22.

Following this, the cartesian co-ordinate data point signals are conveyed separately to the pre-processor 24 wherein they are stored in the comparator 24a. Firstly, the sampled cartesian co-ordinate data point signal $P1_1$ for the first primitive $Pr_1$ is compared with the outer boundary cartesian co-ordinates of the digitizer tablet 20. If the sampled data point signal is detected as being outside the boundary of the tablet 20, it is deleted. Secondly, each of the remaining data point signals $P1_2$ to $P1_5$ are compared with the previous data point signal $P1_1$. For example, if the distance between the data points $P1_2$ and $P1_1$ is less than a predetermined value, the data point signal $P1_2$ is deleted and the data point signal $P1_3$ is compared with the data point signal $P1_1$. If the distance between the data point signals $P1_3$ and $P1_1$ is greater than the threshold value, the data point signal $P1_1$ is stored in the memory 24b and the above-mentioned process is recommenced examining the data point signals $P1_3$ and $P1_4$. This process is performed for each data point signal generated for the first primitive $Pr_1$ until the co-ordinate data representing the inputted primitive $Pr_1$ has been reduced. This process is also performed on the sampled cartesian co-ordinate data point signals for each of the other entered primitives $Pr_2$ and $Pr_3$ and thus, the memory 24b stores the reduced cartesian coordinate data point signals for each of the entered primitives.

When the spurious and redundant sampled cartesian co-ordinate data point signals for each entered primitive have been removed, the resultant data point signals are conveyed from the memory 24b to the feature extraction section 26.

Figure 7:
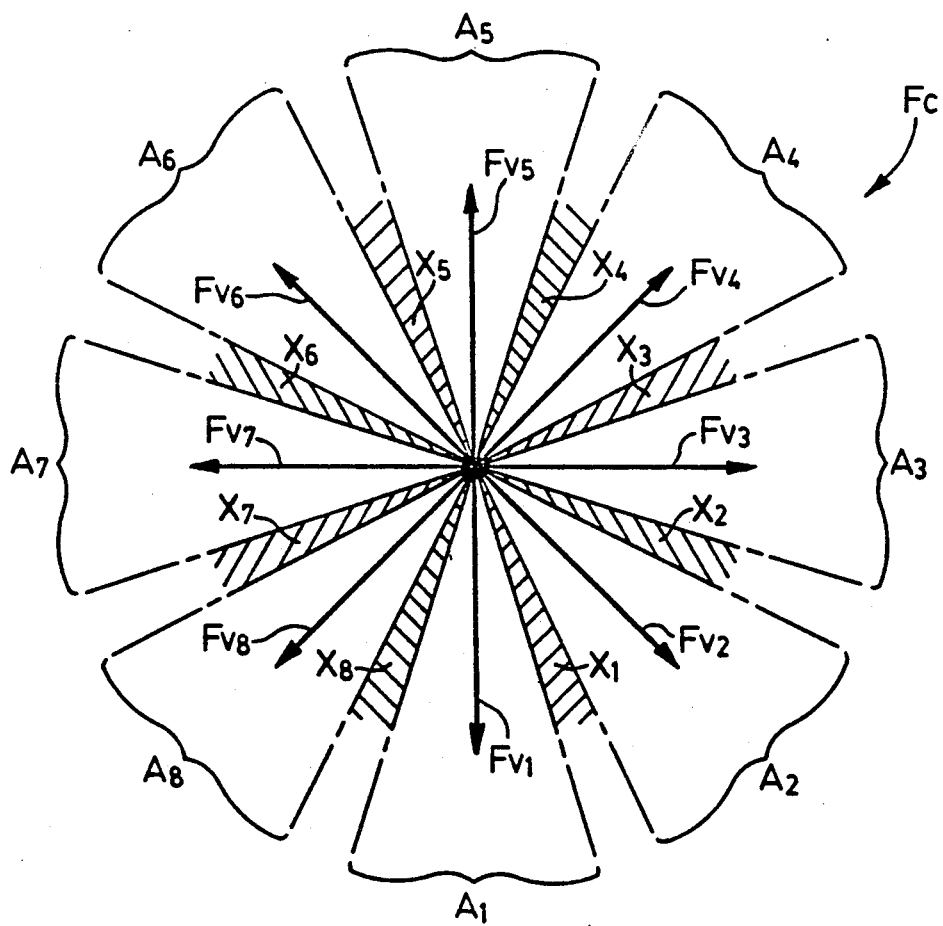
FIG. 7 is an illustration of a coding method used in the device illustrated in FIG. 1.

In the feature extraction section 26, the cartesian co-ordinate data point signals for each entered primitive are converted into a vector code and series of scalars in order to simplify the process of detecting the primitives that were entered on the tablet 20. However, prior to forming the vector code and scalars for the entered primitive, the cartesian co-ordinate data is examined to detect whether it has been reduced to a single pair of co-ordinates by the preprocessor 24. This occurs if the primitive $Pr_e$ is entered on the tablet 20. If this primitive is detected, the primitive code e is output to the memory without requiring any further processing. The feature extraction section 26 implements a modified Freeman coding system FC which is illustrated in FIG. 7 when forming the vector codes and scalars to determine the other primitives. The Freeman coding system allows a series of cartesian co-ordinate data point signals $(P_0, P_1, \ldots P_i, P_{i+1})$ where $P_0$ is equal to $(X_0, Y_0)$ and $P_i$ is equal to $(X_i, Y_i)$, to be converted into a series of unit vectors, each vector of which has an associated length. The unit vectors are formed by comparing a line drawn between adjacent cartesian co-ordinate data point signals $P_i$ and $P_{i+1}$ with one of the eight Freeman unit vectors $FV_1$ to $FV_8$ in the Freeman code FC.

However, due to angles introduced into the shape of the entered primitives on the digitizer tablet 20, a tolerance is required to allow a line formed between a pair of cartesian co-ordinate data point signals $P_i$ and $P_{i+1}$ that is not coincident with a Freeman unit vector $FV_N$ to be assigned to the correct Freeman unit vector. To accommodate these drawing variations of the entered primitives, the Freeman coding system FC uses a 20° tolerance for each of the Freeman unit vectors $PV_N$ and thus, allows any line formed between a pair of cartesian co-ordinate data point signals $P_i$ and $P_{i+1}$ falling within one of the boundaries $A_1$ to $A_8$ to be assigned to the proper Freeman unit vector $FV_N$ associated with that boundary.

To generate tho Freeman unit vector $FV_N$ for each line formed between each adjacent cartesian co-ordinate data point signals for each of the primitives, the pre-processed cartesian co-ordinate data point signals are conveyed to the comparator 26a. In the comparator 26a, adjacent cartesian co-ordinate data point signals are examined and a line is formed therebetween. To reduce the errors introduced in the sampled cartesian co-ordinate data due to inadvertent movement of the stylus 20a by the operator, the length of the line formed between each adjacent data point signal is compared with a threshold value. If the length is less than a predetermined threshold length, the second data point signal is assumed to be the result of a spurious hand movement by the operator and is thus deleted. This process ensures that a horizontal line drawn by an operator with a slight undesired non-horizontal portion will be filtered to produce data representing the desired horizontal line.

After the removal of inadvertent data point signals, lines are formed between the remaining adjacent data point signals and compared with the modified Freeman code FC. If the line falls within one of the tolerance boundaries $A_1$ to $A_8$, the Freeman unit vector $FV_1$ to $FV_8$ associated therewith is conveyed to the memory 26c. If the line formed between two cartesian co-ordinate data point signals falls within one of the invalid boundaries $X_1$ to $X_8$ in the Freeman code FC, the second cartesian co-ordinate data point signal is replaced by the next preceding cartesian co-ordinate data point signal and a new line is formed therebetween. Similarly, the new line is compared with the Freeman code FC once again to detect if the line lies within one of the valid boundaries $A_1$ to $A_8$. If the resultant line falls within a valid boundary $A_N$, the Freeman unit vector $FV_N$ associated with the boundary $A_N$ is conveyed to the memory 26c. However, if a valid Freeman unit vector is not detected, the second data point signal of the pair is replaced by the next preceding data point and the same process is repeated. If a line falling in a valid boundary $A_N$ is still not detected after substituting each of the remaining cartesian co-ordinate data points generated for the entered primitive, the handwritten cartesian co-ordinates are represented by an invalid Freeman unit vector U' and the invalid Freeman vector is conveyed to the memory 26c.

Thus, a series of Freeman unit vectors $FV_i$ to $FV_N$ or U' are formed for each of the entered primitives and are stored separately in the memory 26c. The series of unit vectors are then separately conveyed to the comparator 26d. The comparator 26d compares each unit vector $FV_{i+1}$ with the previous unit vector $FV_i$ and if they are equivalent, a scalar count is incremented for that unit vector and the unit vector $FV_{i+1}$ is deleted. This process is performed on the unit vectors generated for each of the entered primitives Pr. This operation results in the formation of a reduced series of unit vectors or a vector code for each entered primitive forming the character, each vector code of which has an associated series of scalars, which represent the length of each of the unit vectors in the vector code.

For example, if the ideographic IC illustrated in FIGS. 1 and 4 is entered into the apparatus 10, the comparator 26a firstly examines the cartesian co-ordinate data points associated with the first primitive $Pr_1$ and forms the lines $L1_1$ to $L1_4$ between each adjacent data point $P1_1$ to $P1_5$ respectively. The lines $L1_1$ to $L1_4$ are then compared with the Freeman code FC and the associated Freeman vectors $FV_i$ to $FV_N$ are assigned to the lines. Thus, the primitive $Pr_1$ formed from cartesian co-ordinate data points $P1_1$ to $P1_5$ and generating lines $L1_1$ to $L1_4$ as illustrated in FIG. 4 is assigned the Freeman vectors $FV_3$, $FV_3$, $FV_3$, $FV_3$ since each of the lines $L1_1$ to $L1_4$ falls within the boundary $A_3$ (assuming that the length of each of the lines is above the threshold value).

With each of the vectors generated for the primitive $Pr_1$, the series of vectors are conveyed to the memory 26c and stored therein. The above described process is then performed on the cartesian co-ordinate data points associated with the primitives $Pr_2$ and $Pr_3$ and resultant vectors formed therefor are also conveyed to the memory 26c. Following this, the Freeman vectors for each primitive Pr are conveyed to the comparator 26d. Thereafter, adjacent Freeman vectors generated for each primitive are compared. If adjacent vectors are identical, one of the vectors is deleted and the scalar count therefor is incremented. The results from the comparator 26d are then conveyed to the memory 26e.

For example, when the primitive $Pr_1$ shown in FIG. 4a is processed to form the series of Freeman vectors $FV_3$, $FV_3$, $FV_3$, $FV_3$, the comparator 26d reduces the series of vectors to the vector code $FV_3$ having a scalar of 4. If, for example, a primitive was entered and a series of Freeman vectors equal to $FV_3$, $FV_3$, $FV_3$, $FV_4$, $FV_4$, $FV_4$, $FV_5$, $FV_5$, $FV_3$ was generated therefor, the series of unit vectors would be reduced to the vector code $FV_3$, $FV_4$, $FV_5$, $FV_3$, and a series of scalars equal to 3, 3, 2, 1 would be generated.

From the memory 26e, the vector code and associated series of scalars for each primitive forming the entered character are conveyed to the primitive detection section 28. The vector codes are applied to the comparator 28a and the series of scalars are stored in the memory 28c. The vector codes received by the comparator 28a are compared with the vector codes stored in the primitive dictionary 28b. The dictionary 28b is partitioned into sixteen primitive code sections, the first fifteen sections of which are uniquely associated with one of the fifteen primitives $Pr_a$ to $Pr_o$ and store vector codes uniquely associated with that primitive. The sixteenth section holds ambiguous vector codes which can represent more than one of the primitives. The sixteenth section also holds unique test information for each ambiguous vector code to allow the correct entered primitives to be determined.

If the vector code for an entered primitive is equivalent to a vector code found in one of the first fifteen sections of the dictionary 28b, the primitive code a to o associated therewith is conveyed to the memory 30. This process is performed for each of the vector codes generated for each primitive forming the entered character. Thus, a series of primitive codes or a character code is generated, the character code of which represents the ideographic character entered on the digitizer tablet 20.

However, when a vector code generated for one of the primitives is compared with the contents of the dictionary 28b and it is equivalent to a vector code stored in the sixteenth section, the test information associated with the ambiguous vector code is applied to the test section 28d. The test section 28d receives the test information and examines it to determine which vector code is being examined. Thereafter, the test section 28d receives the series of scalars associated with the examined vector code and performs operations thereon, the operations of which are determined by the unique test information. The results of the tests are conveyed back to the dictionary 28b which in turn selects the correct primitive code that represents the entered primitive. The series of scalars provide suitable information to discriminate between each ambiguous vector code since although the vector codes are ambiguous, the value of each scalar in the series are typically very different.

Figure 8A:
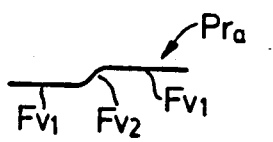
FIGS. 8a and 8b are illustrations of entered fundamental strokes.
Figure 8B:
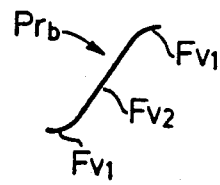

For example, if the primitive $Pr_a'$ illustrated in FIG. 8a was entered on the tablet 20, a vector code equivalent to $FV_1$, $FV_2$, $FV_1$ would be generated. However, the vector code would be detected in the sixteenth section of the dictionary 28b since this vector code is also used to represent the primitive $Pr_b$ illustrated in FIG. 8b. Although the vector codes for the two primitives are identical, the series of scalars associated therewith are very different. As can be seen the series of scalars associated with the primitive $Pr_a$ would be 3, 1, 3 whilst the series of scalars associated with primitive $Pr_b$ would be 1, 5, 1. Thus, by comparing the relative lengths between the first two scalars in the series, the correct primitive code can be determined.

If the vector code being compared with the contents of the dictionary 28b is not equivalent to a vector code located therein, the vector code is assigned an unidentified primitive code U which is similarly applied to the memory 30. Thus, the output of the primitive detection section 28 comprises a series of primitive codes or a character code, which represents the inputted ideographic character IC.

The character code stored in the memory 30 is applied to the character code recognition section 32 and received by the comparator 32a. The comparator 32a compares the character code with the contents of the handwritten character dictionary 32b generated for the entered character. As mentioned previously, the dictionary 32b stores a character code for each of the possible ideographic characters in the language along with its corresponding international ASCII output code. The international ASCII output code is used internationally to represent the ideographic character. Since a number of ideographic characters are formed from the same primitives entered in the same order, some ideographic characters have identical character codes although the relative positions between the entered primitives are very different. To allow the apparatus 10 to detect the proper ideographic character when an ambiguous character code is received, the character dictionary 32b also contains test information uniquely associated with each ambiguous character code.

When a character code is received from the memory 30, it is compared with the contents of the dictionary 32b via comparator 32a. If the received character code is equivalent to a character code found in the dictionary 32b that is uniquely associated with only one ideographic character, the international ASCII output code associated therewith is output from the dictionary 32b and stored in the memory 34. However, when the character code generated for the entered ideographic character is equivalent to an ambiguous character code that is associated with more than one ideographic character, the unique test information associated therewith is applied to the character differentiator 32c.

Upon reception of the test information, the differentiator 32c retrieves the unprocessed cartesian co-ordinate data from the memory 22 and performs operations thereon as determined by the test information in order to determine the international ASCII output code that represents the input handwritten ideographic character. When performing the test operations, the unprocessed cartesian co-ordinate data points are used as opposed to the series of scalars formed therefor, since the unprocessed cartesian co-ordinate data contains information regarding the relative position of each of the entered primitives. When the correct international ASCII output code has been determined, it is similarly conveyed to the memory 34.

Figure 9A:
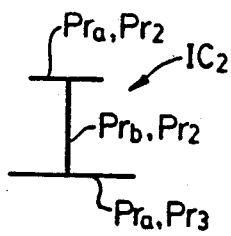
FIGS. 9a and 9b are illustrations of still more ideographic characters.
Figure 9B:
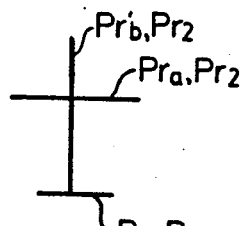

For example, if the ideographic character illustrated in FIG. 1 was entered into the apparatus, a character code equal to "aba" would be generated and compared with the contents of the dictionary 32b. However, the character code would be detected as being ambiguous since the ideographic characters IC2 and IC3 shown in FIGS. 9a and 9b respectively are also represented by the same character code "aba". The unique test information associated with the character code "aba" would be applied to the differentiator 32c, along with the unprocessed cartesian co-ordinate data from the memory 22. For this example, the test information would cause the differentiator 32c to examine the position of the second primitive $Pr_2$ with respect to the first primitive $Pr_1$ to determine if the second primitive $Pr_2$ passes through the first primitive $Pr_1$. If the result of this test was negative, the differentiator 32c would acknowledge that the ideographic character IC is not equivalent to ideographic character IC2 since this feature is not present in the character IC2. To distinguish between the ideographic character IC and IC3, the third primitive $Pr_3$ is compared with the first primitive $Pr_1$ forming the entered ideographic character IC and the relative sizes therebetween are examined. The result of this test enables the differentiator 32c to select the correct international ASCII output code since the primitive $Pr_1$ is smaller than the primitive $Pr_3$. The dictionary 32b receives the results generated by the differentiator 32c and the correct international ASCII output code is conveyed to the memory 34.

After the international ASCII output code has been determined and stored in the memory 34, it can be applied to output devices such as a printer 16a, a VDT terminal 16b or an audio synthesizer 16c in order to produce an image of the inputted ideographic character.

However, if the character code is formed from a series of primitive codes wherein one or more of the primitives have been assigned unidentified primitive codes U or if the character code is not equivalent to any of the character codes found in the character dictionary 32b, the character code is applied to the substitution and correction section 36. The substitution and correction section 36 includes the probability matrix 36a, which is in the form of a sixteen row by fifteen column array of registers $36_a'$. As shown in FIG. 10, each row of the matrix is associated with one of the possible sixteen primitive codes a to o including the unidentified primitive code U and each of the columns of the matrix is associated with one of the fifteen possible primitive codes a to o. Each of the registers $36_a'$ holds a number representing the probability that the primitive code of the row could be mistaken for the primitive code of the column.

Thus, the probability values stored in the registers along the left to right diagonal of the matrix 36a all have values of 1 since the probability that a primitive code will be detected as itself is high. The probability of two very dissimilar primitives being mistaken for one another is highly improbable and thus, the probability values stored in a register associated with two very dissimilar primitives is typically zero. For example, looking at the first row of the matrix 36a which is associated with the primitive $Pr_a$, the probability that the primitive $Pr_a$ could actually be mistaken for primitive $Pr_c$ is 0.0 since these primitives are very different. Primitives which have some similarities to other primitives are assigned probability values ranging from between 0.1 to 0.9, depending on the number of similarities therebetween.

When a character code is received in the comparator 36b having at least one unidentified primitive code U therein, the probabilities in the row associated with the primitive code U are examined. When the highest probability value in the row is detected, the primitive code of the column is used to replace the unidentified primitive code U. The resultant character code is conveyed back to the comparator 32a and is compared with the contents of the character dictionary 32b to detect if the resultant character code is equivalent to a character code found therein. If the resultant character code is equivalent to a character code in the dictionary, the international ASCII output code is retrieved from the dictionary 32b and conveyed to the memory 34 wherein it is stored. If the resultant input character code is equivalent to an ambiguous character code, tests are performed on the cartesian co-ordinate data stored in the memory 22 in the same manner as previously described to determine the correct international ASCII output code.

However, if the resultant character code is not equivalent to a character code found in the dictionary 32b or if the originally entered character code does not correspond with a character code found in the dictionary 32b, a second substitution is performed. When one of the above cases occurs, the character code is conveyed to the comparator 36b and examined to identify the number of primitive codes forming the character code. Following this, each character code in the character dictionary 32b formed from the same number of primitive codes is conveyed to the comparator 36b and compared with the unidentified character code. During this comparison, the number of differences between the primitive codes forming each of the character codes and the primitive codes forming the unidentified character code are examined. If the number of differences detected between the character code and the unidentified character code is greater than a threshold value, the character code is discarded.

However, every character code having a smaller number of differences than the threshold value is noted and the international ASCII output code associated therewith is stored in the memory 36c. The order of the international output codes stored in the memory 36c is chosen so that the first international ASCII output code in the memory is associated with the character code most similar to the unidentified character code. The international output codes stored in the memory 36c are then retrieved from the memory 36c and conveyed to the VDT terminal, thereby displaying to the user each of the ideographic characters that are most likely to be equivalent to the entered ideographic character. The user may then choose the ideographic character corresponding to the ideographic character that was entered into the apparatus 10 via suitable editing software. If the substitution section 36 does not produce the desired ideographic character, editing programs can be used to retrieve the correct international ASCII output code from the dictionary 32b.

The ideographic character signals stored in the memory 34 can be coupled to the printer 16a to allow a reproduction of the inputted ideographic character to be generated. Furthermore, the character signals can be conveyed to the VDT screen 16b to allow the user to view the characters that have been entered into the apparatus 10. The apparatus 10 is also capable of functioning with known editing programs to allow the user to change the ideographic character signals stored in the memory 34.

When the apparatus 10 is conditioned in one of the other modes so that the apparatus functions to recognize characters of a different language, the same set of primitives shown in FIG. 3 are used to form the characters. It should be apparent that the primitives shown in FIG. 3 are particularly useful in forming ideographic and upper case English language characters since all of the characters in these languages can be formed from these primitives. However, it should be appreciated that other primitives may have to be added so that all of the characters in all languages can be formed. This will be rare however since the twenty primitives should be capable of forming substantially all of the characters in every language.

As mentioned previously, the dictionaries in the processor 14 are partitioned with each partition holding the various primitive codes, character codes and ASCII output codes for each upper case character in the other languages. The upper case characters are stored in the apparatus since these characters are typically written in the same manner and order by everyone versed in the language. The various sections in the processor also include test information to allow different characters which generate the same character code to be recognized.

For languages which use strokes similar to primitives $Pr_p$ to $Pr_t$ when forming the characters therein, the primitive detection and primitive code determination is performed in the same manner previously described using the Freeman coding except when one of the primitives $Pr_p$ to $Pr_t$ are entered on the tablet 20. Accordingly. When a primitive is entered on the tablet 20, the feature extraction section 26 examines the tangents of the lines formed between the sampled points along the primitive to determine the degree of curvature of the primitive (i.e. 180°, 270°, 360° ) prior to using the Freeman Coding.

If the primitive is detected as having a curvature of substantially 270° or 360°, the primitive code s or t associated with the entered primitive $Pr_s$ or $Pr_t$ is immediately determined without further processing. If the curvature of the primitive is detected as being approximately 180°, the starting and ending co-ordinate data signals of the primitive are examined along with the direction of the tangents (i.e. clockwise or counterclockwise) This allows the primitives $Pr_p$ to $Pr_r$ to be differentiated without requiring further processing. Otherwise if the entered primitive is not detected as having a substantially constant gradient when examining the tangents, the preprocessed co-ordinate data signals are processed using the Freeman coding to determine the correct primitive code.

Figure 11:
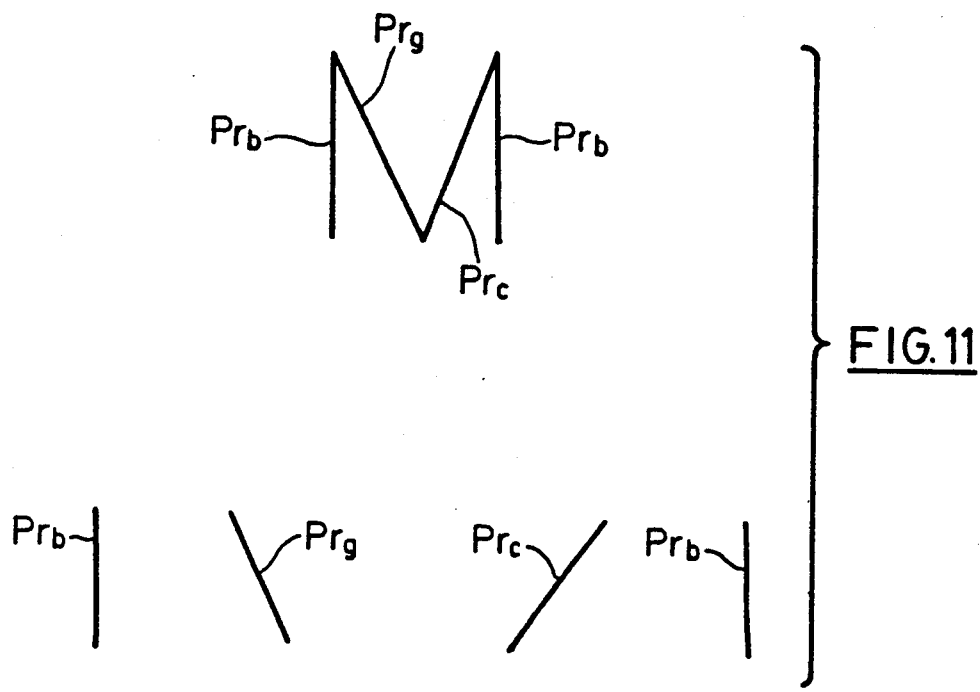
FIG. 11 is an illustration of an English character.

For example, referring to FIG. 11, if the apparatus is conditioned to recognize English language characters and the character "M" is entered on the tablet 20, the primitives $Pr_b$, $Pr_g$, $Pr_c$ and $Pr_b$ are used to form the character. These primitives are processed by the feature extraction section 26 and the primitive detection section in the same manner previously described. Accordingly, a character code equal to "bgcb" would be generated. The associated ASCII output code would output since this code is only associated with the character "M" in the English language.

Figure 12:
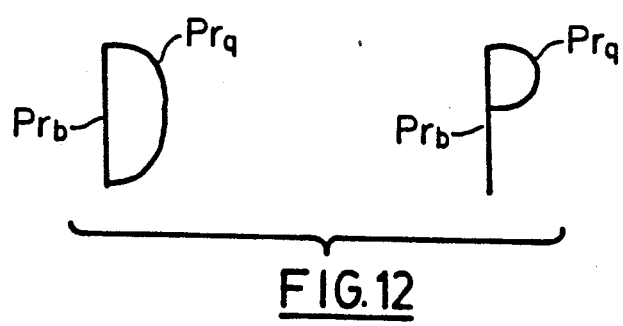
FIG. 12 is an illustration of more English characters.

If for example, the English characters "D" and "P" were entered on the tablet 20 as shown in FIG. 12, the character code generated for each character would be "bq" since the primitives forming both characters are $Pr_b$ and $Pr_q$. Thus, if one of these characters is entered, test information stored in the character dictionary is used in a similar manner to that previously described and the length of the primitive $Pr_b$ and the length between the starting and ending points of primitive $Pr_q$ are examined. This allows the two characters to be differentiated even though the character codes generated for the two characters are the same.

With respect to other languages such as German, French etc. the method of detecting the handwritten characters is the same although the apparatus must be conditioned to the appropriate mode via means 18. This is even necessary for languages such as German, French and English wherein the characters forming the language are the same since the ASCII output codes therefor are different. The substitution matrix can also be used for each of the other languages although it is not necessary due to the small number of characters used in non-ideographic languages.

Also, when the apparatus 10 is conditioned to detect upper characters of a language the device is also provided with software for generating the ASCII code for the lower case equivalent of the detected upper case character if desired. Although the lower case letters can be detected in a similar manner to the upper case letters, lower case letters are typically written differently by individuals thereby making the detection process more difficult and requiring more memory space to permit detection of the character in the many possible ways that it can be written.

The present apparatus has been employed in an IBM PC XT personal computer manufactured by International Business Machines provided with a 20 Mb hard disk which functions to store the information for the dictionaries. To perform the identification processes described hereinabove, the computer is supplied with the appropriate software which allows the input cartesian co-ordinate data point signals to be processed in the above-mentioned manner. Since a large amount of data is stored in the dictionary 32b, i.e. character codes and associated international output codes for approximately 50,000 different ideographic characters, a B-tree algorithm, which is well known in the art, is used to increase the speed of the detection between the character code generated for the input ideographic and the character codes stored therein. Although the B-tree algorithm increases processing speed, it also increases memory requirements, since indexing files are required.

The present apparatus 10 can also be manufactured on a small integrated circuit board capable of being coupled to a conventional personal computer, the board of which is provided ROM components to store the various dictionary contents and a microprocessor including appropriate software to perform the data processing functions.

Thus, the present apparatus provides the advantages of being able to distinguish between characters which are formed from the same primitives entered in the same order. This decreases the occurrences of an operator having to halt data entry operations in order to choose the correct ideographic character. Moreover, the substitution means further decreases the above-mentioned occurrence since a different character code that is most similar to the entered character code, is automatically selected if the input character is not found in the apparatus 10. Furthermore, since the apparatus can be generated using software or manufactured using hardware components, the apparatus is versatile and can be used in various environments.

The present device also provides further advantages in that the manner in which the entered strokes are processed in the apparatus, allows the strokes to be written substantially anywhere on the tablet surface except for the small number of characters which generate an ambiguous character code. Also, the processing used prior to the determination the primitives forming the character allows the entered characters to be determined irrelevant of the length of the entered primitives except for a few exceptions. Furthermore, the simply approach and processing allows handwritten characters in substantially all languages to be recognized quickly thereby allowing the device to be used in real-time applications.

It should be apparent to one skilled in the art that the present device can be modified to detect any inputted character provided the appropriate information regarding the character to be detected is stored in the dictionaries located therein.

We claim:

1. A character recognition apparatus for identifying a handwritten of a predetermined set of characters formed from at least one primitive selected from a predetermined set of primitives illustrated in FIG. 3 with said set of primitives forming said handwritten character being written in an order determined by pre-defined rules, said apparatus comprising:
   input means for receiving successively and in accordance with said pre-defined rules each of the primitives forming said handwritten character and generating input signals for each of said received primitives;
   processing means for receiving said input signals and identifying each of said primitives received by said input means, said processing means generating a character code representing said handwritten character upon identification of said primitives forming said handwritten character;
   storage means for storing a character code and an associated output code for each of the characters in said predetermined set;
   comparing means for comparing said character code generated for said handwritten character with said character codes in said storage means to identify said handwritten character; and
   output means in communication with said comparing means and generating a reproduction of said handwritten character upon the identification thereof by said comparing means.

2. The character recognition apparatus as defined in claim 1 further comprising:
   differentiation means for examining said input signals generated for each of said received primitives and performing operations thereon when said character code generated for said handwritten character is equivalent to a character code in said storage means associated with a plurality of output codes to identify the output code associated with said handwritten character.

3. The character recognition apparatus as defined in claim 2 wherein said primitives in FIG. 3 are capable of forming every character in a plurality of languages while reducing the number of characters in said languages formed from the same series of primitives, said storage means storing a character code and an output code for each of said characters in said plurality of languages.

4. The character recognition apparatus as defined in claim 3 wherein said storage means further stores character test information, said test information being provided for each character code in said storage means associated with more than one output code, said differentiation means receiving said character test information and said input signals and performing said operations thereon in accordance with said character test information to detect the output code corresponding to said handwritten character.

5. The apparatus as defined in claim 3 wherein said processing means generated an unidentified primitive code for each handwritten primitive not detected as being in said set, said apparatus further comprising substitution means having means for receiving said character code generated for said handwritten character when it is not equivalent to any of said character codes in said storage means, said substitution means including comparator means comparing each primitive code forming character code generated for said handwritten character with the corresponding primitive code of said character codes in said storage means formed from the same number of primitive codes as the character code generated for said handwritten character; and
   a memory for storing the output code associated with each of the character codes in said storage means having fewer than a predetermined number of differences when compared with character code generated for said handwritten character.

6. The apparatus as defined in claim 5 wherein said substitution means further comprises a probability matrix, said probability matrix generating a substitution primitive code most likely to be the unidentified primitive code when said substitution means receives a character code generated for a handwritten character having at least one unidentified primitive code therein and replacing said unidentified primitive code with said substitution primitive code to form a character code equivalent to a character code stored in said storage means, and most likely to represent said handwritten character.

7. The apparatus as defined in claim 1 wherein said input means is an on-line digitizer tablet providing cartesian co-ordinate data for each of said primitives forming said handwritten character, said processing means further comprising encoding means for examining said cartesian co-ordinate data for each of said primitives forming said handwritten character and forming therefrom a series of unit vectors.

8. The apparatus as defined in claim 7 wherein said encoding means is a modified Freeman encoder which includes a plurality of freeman unit vectors, said encoder detecting only substantially vertical, horizontal and diagonal strokes forming the primitives constituting said handwritten character.

9. The apparatus as defined in claim 8 wherein said processing means further comprises:
feature extraction means for receiving said series of unit vectors for each of said primitives and eliminating redundant unit vectors to form a vector code and an associated series of scalars for each of said handwritten primitives;
holding means for storing vector codes and an associated primitive code representing each of said primitives in said set along with an unidentified primitive code; and
comparator means for comparing said vector codes generated for said handwritten character with said vector codes stored in said holding means, said comparator means generating said primitive code when said vector code is equivalent to a vector code stored in said holding means and generating said unidentified primitive code when said vector code is not equivalent to a vector code stored in said holding means.

10. The apparatus as defined in claim 9 wherein said holding means is further provided with primitive test information, said information being uniquely associated with vector codes which represent more than one primitive in said set, said processing means further comprising a test section receiving said primitive test information and said series of scalars associated with said vector code and performing operations thereon to detect the correct primitive code associated with said vector code generated for said handwritten the primitive when said vector code is equivalent to a vector code representing more than one primitive.

11. The apparatus as defined in claim 1 wherein said output means is selected form the group comprising:
a printer, an audio-synthesizer and a video display terminal.

12. An apparatus as defined in claim 9 further comprising pre-processing means for receiving said cartesian co-ordinate data, said preprocessing means comparing the distance between first and adjacent second co-ordinates and removing said second co-ordinate if said distance is less than a predetermined threshold value thereby reducing the amount of redundant data.

13. A method of identifying a handwritten character of a pre-determined set of characters formed from at least one primitive selected from the set of primitives shown in FIG. 3, said method comprising the steps of:
receiving successively and in an order determined by pre-define rules each of said primitives forming said character and generating input signals for each of said received primitives;
examining said input signals to identify each of said entered primitives forming said handwritten character;
generating a primitive code for each of said primitives forming said handwritten character to form a character code upon identification of said primitives forming said handwritten character;
storing a character code and an associated output code for each of said characters in said set;
comparing said character code formed for said handwritten character with said character codes stored to detect said output code when said character code generated for said handwritten character is equivalent to a stored character code associated with only one output code; and
examining said primitive codes generated for said handwritten character and performing operations thereon when said character code is equivalent to a stored character code associated with more than one output code in order to detect the output code associated with said entered character; and
generating an image of said handwritten character upon detection of said associated output code.

14. A character recognition apparatus for identifying a handwritten character formed from at least one primitive, said character and said primitives being members of predetermined sets, said apparatus comprising:
input means for receiving successively and in order determined by pre-defined rules, each of the handwritten primitives forming said handwritten character said input means generating input signals for each of said handwritten primitives;
processing means receiving said input signals for each of said primitives, said processing means converting the input signals generated for each primitive into data representing a series of generally horizontal, vertical and diagonal vectors and comparing said data with stored information therein and generating a primitive code for each of the primitives when said data are detected as being equivalent to stored information associated with a single primitive;
first differentiation means in communication with said processing means and performing discriminatory tests on said data when said data are detected as being equivalent to stored information associated with a plurality of primitives to determine the primitive associated with said data to permit said processing means to determine said primitive code, the series of primitive codes generated by said processing means forming a character code;
storage means storing a character code and an associated output code for each of the characters in said predetermined set;
comparing means comparing said character code generated for said handwritten character with said character codes in said storage means to identify said entered handwritten character;
second differentiation means examining said input signals generated for each of said handwritten primitives and performing discriminatory tests thereon when said character code generated for said handwritten character is equivalent to a character code in said storage means associated with a plurality of output codes to identify the output code associated with said handwritten character; and
output means in communication with said comparing means and said second differentiation means and generating a reproduction of said handwritten character upon identification of the output code associated with the handwritten character.

15. The character recognition apparatus as defined in claim 14 wherein said primitives are capable of forming substantially every character in a plurality of languages, said storage means storing a character code and an output code for each of said characters in said plurality of languages.

16. The character recognition apparatus as defined in claim 15 wherein said storage means further stores character test information, said test information being provided for each character code associated with more than one output code, said second differentiation means receiving said character test information and said output signals and performing said discriminatory test on said input signals in accordance with said character test information to detect the output code corresponding to said handwritten character.

17. The character recognition apparatus a defined in claim 16 wherein said predetermined set of primitives includes twenty distinct primitives, the various combination of said twenty primitives being capable of forming substantially all characters in said plurality of languages, a substantial portion of said primitives being formed from only substantially horizontal, substantially vertical and substantially diagonal components.

18. The character recognition apparatus as defined in claim 17 further comprising:
   substitution means receiving the character code generated for said handwritten character when said character code is not equivalent to any of said character codes stored in said storage means, said substitution means including comparator means for comparing each primitive code forming said character code generated for the handwritten character with the corresponding primitive codes forming said character codes in said storage means having the same number of primitive codes as the character code generated for the handwritten character to detect differences between the character code and said character codes in said storage means; and
   a memory for storing the output code associated with each of the character codes in said storage means having fewer than a predetermined number of differences when compared with the character code generated for the handwritten character.

19. The character recognition apparatus as defined in claim 18 wherein said processing means generates an unidentified primitive code when said processing means and said first differentiation means do not detect said data as being equivalent to any information stored therein, said unidentified primitive code when generated forming part of said character code, said substitution means further comprising a probability matrix, said probability matrix generating a substitution primitive code most likely to be the unidentified primitive code when said substitution means receives a character code having at least one identified primitive code therein and replacing said unidentified primitive code with said substitution primitive code in an attempt to form a character code equivalent to a character code stored in said storage means and most likely to represent said handwritten character.

20. The character recognition apparatus as defined in claim 14 wherein said input means is an on-line digitizer tablet generating cartesian co-ordinate data for each of said primitives forming said handwritten character, said processing means further comprising encoding means for examining said cartesian co-ordinate data for each of said primitives and forming therefrom a series of vectors and associated series of scalars.

21. The character recognition apparatus as defined in claim 20 wherein said encoding means is a modified Freeman encoder, said encoder examining said series of vectors to detect substantially horizontal, substantially vertical and substantially diagonal unit vectors and converting said series of vectors into said data, said first differentiation means performing discriminatory tests on said associated scalars when said data generated for a primitive forming part of said handwritten character is detected as being equivalent to stored information associated with a plurality of primitives to determine the primitive associated with the data.

22. The character recognition apparatus as defined in claim 21 wherein said processing means further comprises feature extraction means receiving said series of vectors for each of said primitives and eliminating redundant vectors to form said data, said data being in the form of a vector code and said associated series of scalars for each of said handwritten primitives;
   holding means for storing vector codes and an associated primitive code representing each of said primitives in said set along with an unidentified primitive code; and
   comparator means for comparing said vector codes generated for said handwritten primitive with said vector codes stored in said holding means, said comparator means output said primitive code when said vector code is equivalent to a vector code stored in said holding means and output said unidentified primitive code when said vector code is not equivalent to a vector code stored in said holding means.

23. The apparatus as defined in claim 22 wherein said holding means is further provided with primitive test information, said information being uniquely associated with vector codes which represent more than one primitive, said first differentiation means receiving said primitive test information and said series of scalars associated with said vector code from said processing means and performing operation thereon to detect the correct primitive code associated with said vector code when said vector code is equivalent to a vector code representing more than one primitive code.

24. An apparatus as defined in claim 23 further comprising a pre-processing means for receiving and conditioning said cartesian co-ordinate data to eliminate spurious data and to reduce redundant data.

25. The apparatus defined in claim 14 wherein all primitives are generally horizontal vectors, generally vertical vectors, generally diagonal vectors, or a combination of generally horizontal, vertical and diagonal vectors.

26. A method of identifying a handwritten character formed from at least one primitive, said character and said primitives being members of predetermined sets, said method comprising the steps of:
   receiving successively and in an order determined by predefined rules each of said primitives forming said character in a predetermined manner and generating input signals for each of said received primitives;
   examining and converting the input signals for each primitive into data representing a series of generally horizontal, vertical and diagonal vectors and comparing said data generated for each of said entered primitives with stored information to identify each of said entered primitives forming said character;
   generating a primitive code for each of said primitives when the data are detected as being associated with only one primitive and performing tests on said data to determine the correct primitive code when said data are detected as being associated with more than one primitive;
   forming a generated character code from said series of primitive codes;

storing a character code and an associated output code for each of said characters in said set;

comparing the generated character code with said stored character codes to determine said output code when said generated character code is equivalent to a stored character code associated with only one output code;

examining said input signals generated for said entered primitives and performing tests thereon when said generated character code is equivalent to a stored character code associated with more than one output code in order to determine the output code associated with said handwritten character; and generating an image of said handwritten character upon detection of said correct output code.

27. The character recognition apparatus as defined in claim 14 wherein the discriminatory tests determine the relative length between two primitives forming said handwritten character or whether one primitive forming the handwritten character crosses another.

28. The character recognition apparatus as defined in claim 21 wherein the discriminatory tests determine the relative length of the vertical, diagonal and horizontal vectors generated for the primitive.

29. The character recognition apparatus as defined in claim 4 wherein said test information causes said differentiation means to determine the relative length between two primitives forming said handwritten character or whether one primitive forming the handwritten character crosses another.

30. The character recognition apparatus as defined in claim 10 wherein said test section examines said vector codes to determine the relative length of the vector codes generated for the handwritten character.

* * * * *